United States Patent [19]

Taylor

[11] 4,052,992

[45] Oct. 11, 1977

[54] SHELLING MACHINE

[76] Inventor: George F. Taylor, P.O. Box 625, Moultrie, Ga. 31768

[21] Appl. No.: 662,709

[22] Filed: Mar. 1, 1976

Related U.S. Application Data

[63] Continuation-in-part of Ser. No. 596,434, July 16, 1975, abandoned.

[51] Int. Cl.² ............................................. A01F 9/00
[52] U.S. Cl. ............................................. 130/30 H
[58] Field of Search ............... 130/30 H, 30 R, 30 E, 130/30 F; 56/294

[56] References Cited

U.S. PATENT DOCUMENTS

| 527,954 | 10/1894 | Empson | 130/30 H |
|---|---|---|---|
| 2,193,530 | 3/1940 | Cottengim | 198/168 |
| 2,633,852 | 4/1953 | Lupton | 130/30 H |
| 2,865,378 | 12/1958 | Carmichael, Jr. | 130/30 H |
| 2,984,338 | 5/1961 | Pockman et al. | 198/224 |
| 3,292,353 | 12/1966 | Woodring et al. | 56/294 |

Primary Examiner—Russell R. Kinsey
Attorney, Agent, or Firm—Newton, Hopkins & Ormsby

[57] ABSTRACT

A machine is disclosed for shelling beans, peas and other legumes. The machine comprises a frame and a lid mounted atop the frame for movement between lid open and lid closed positions. A drum which includes removable sections is rotatably mounted to the frame beneath the lid. Shrouds are mounted about and in spaced relation with the drum. Sets of beaters are rotatably mounted to the frame for rotation within the drum. The beaters themselves have swing arms rotatably mounted thereto. Drive means are provided for rotating the drum and the beaters at diverse speeds. A baffle is pivotably mounted to the frame beneath the drum for movement between first and second baffle positions for alternatively deflecting fruit of shelled legumes into a sieve and their hulls into collection bins.

11 Claims, 17 Drawing Figures

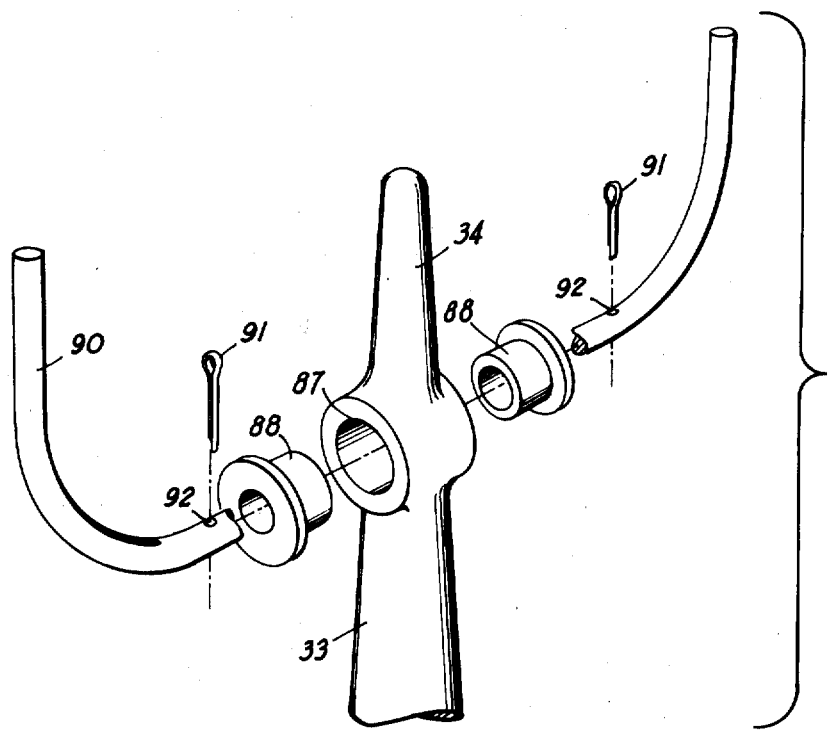
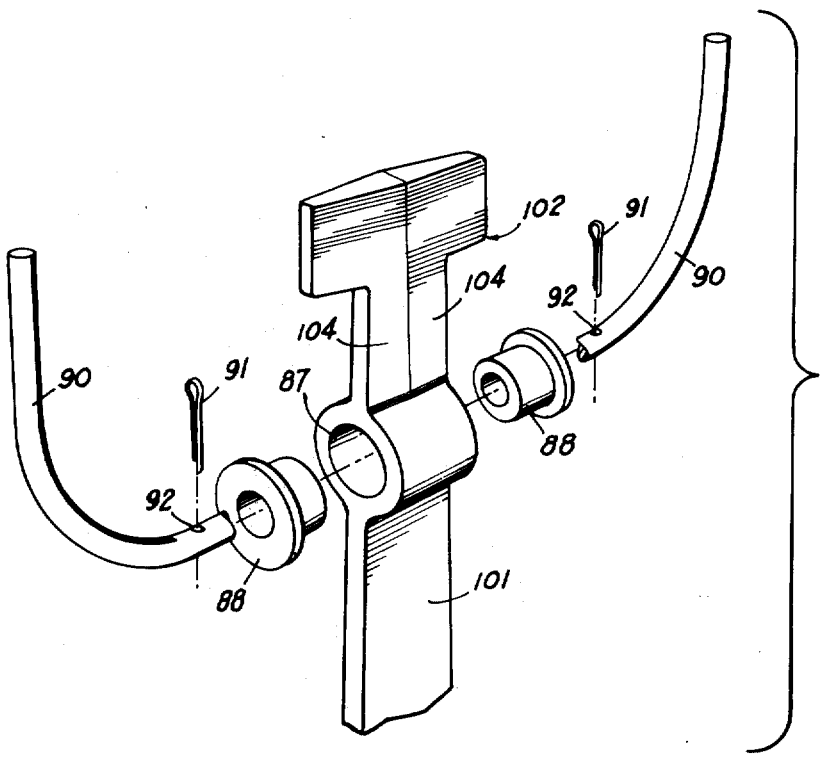

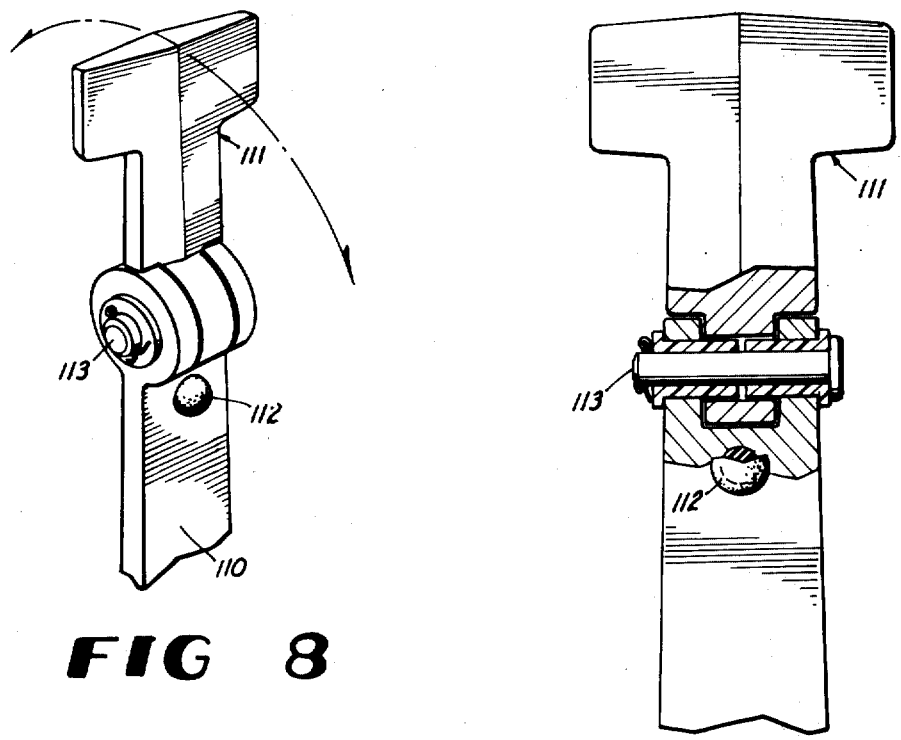
FIG 8
FIG 9
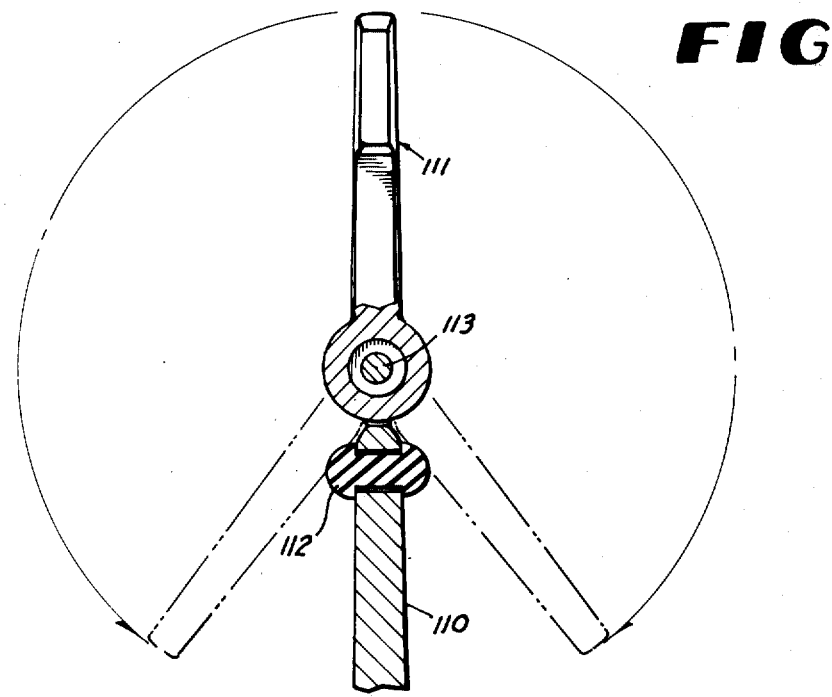
FIG 10

1

SHELLING MACHINE

REFERENCE TO RELATED APPLICATION

This is a continuation-in-part of U.S. Pat. application Ser. No. 596,434 filed July 16, 1975, and now abandoned, titled "Improved Bean Sheller".

BACKGROUND OF THE INVENTION

This invention relates generally to shellers for shelling beans, peas and other legumes, and particularly to those types of shellers that employ a set of beaters rotatably mounted within a previous, rotatable drum such as those disclosed in U.S. Pat. Nos. 773,858; 957,443; 1,725,938; 2,633,852; 3,087,499 and 3,240,211.

In shellers of the just described type, unshelled beans or peas are placed within a drum and the drum and beaters therein rotated. As the beaters strike the beans or peas the fruit is separated from their hulls. Being smaller than the hulls, the fruit falls through the previous drum which typically is formed of screen. After falling out of the drum, the shelled fruit is directed into collection pans or bins while the shells or hulls remain within the drum for subsequent removal.

Though the just described shellers have proved effective in shelling beans and peas, they have been operationally deficient in several respects. For example, the machines have been relatively slow in shelling various types of beans such as butterbeans. Frequently, the hulls have tended to accumulate at one end of the drum placing an imbalanced torque on the rotating beaters as well as necessitating excessively frequent removal of the hulls from the drum. The extraction process of the hulls itself has been cumbersome. Trash has also been frequently found in the accumulation in the collection bins along with the shelled beans. Often, hulls have also become jammed in the screen. Furthermore, where the drum is filled to a substantial degree with podded hulls for shelling their bulk presents substantial resistance to initial, start-up movement of the paddles often creating overload conditions.

Accordingly, it is an object of the present invention to provide a sheller for shelling beans, peas and other legumes with improved efficiency and effectiveness.

Another object of the present invention is to provide a sheller adapted to shell butterbeans with improved speed of operation.

Another object of the invention is to provide a sheller of the type employing a rotatable drum and a set of beaters rotatably mounted therein with improved means for inhibiting the accumulation of hulls adjacent one end of the drum.

Another object of the invention is to provide a sheller of the type employing a rotatable drum and a set of beaters rotatably mounted therein with improved means for extracting shelled hulls from the drum.

Another object of the invention is to provide a sheller of the type described with improved means for inhibiting the accumulation of trash in the collection bins for the shelled fruit.

Yet another object of the invention is to provide a sheller having a rotatable screen drum with shroud means for inhibiting the jamming of hulls in the screen or the fruit of the hulls being thrown through the screen with centrifugal force and bruised.

Still another object of the invention is to provide a sheller of the type described with means for inhibiting hulls placed in the sheller drum for shelling from providing excessive resistance to initial start-up movement of the sheller beaters.

SUMMARY OF THE INVENTION

In one form of the invention a machine is provided for shelling beans, peas and other legumes. The machine comprises a generally cylindrical rotatable screen drum and shroud means mounted about the cylindrical screen in spaced relation therewith for restricting the passage of legumes therethrough. A plurality of axially spaced beaters is mounted for rotation within the cylindrical screen. Drive means are also provided for rotating the drum and the sets of beaters.

In another form of the invention a sheller is provided having a rotatable screen drum and a plurality of beaters mounted for rotation within the drum with at least some of the beaters having a swing arm rotatably mounted thereto. Drive means are also provided for driving the rotatable drum and the plurality of beaters.

BRIEF DESCRIPTION OF THE DRAWING

FIG. 6 is an exploded view in perspective of a portion of the beater shown in FIG. 5.

FIG. 7 is an exploded view in perspective of a portion of a beater in an alternative form for use in the sheller of FIGS. 1-3.

FIG. 8 is a perspective view of a portion of a beater in another, alternative form for use in a sheller of the type illustrated in FIGS. 1-3.

FIG. 9 is a front elevational view, partly in cross section, of the beater shown in FIG. 8.

FIG. 10 is a side elevational view, partly in cross section, of the beater shown in FIG. 8.

DESCRIPTION OF THE PREFERRED EMBODIMENT

Figure 1:
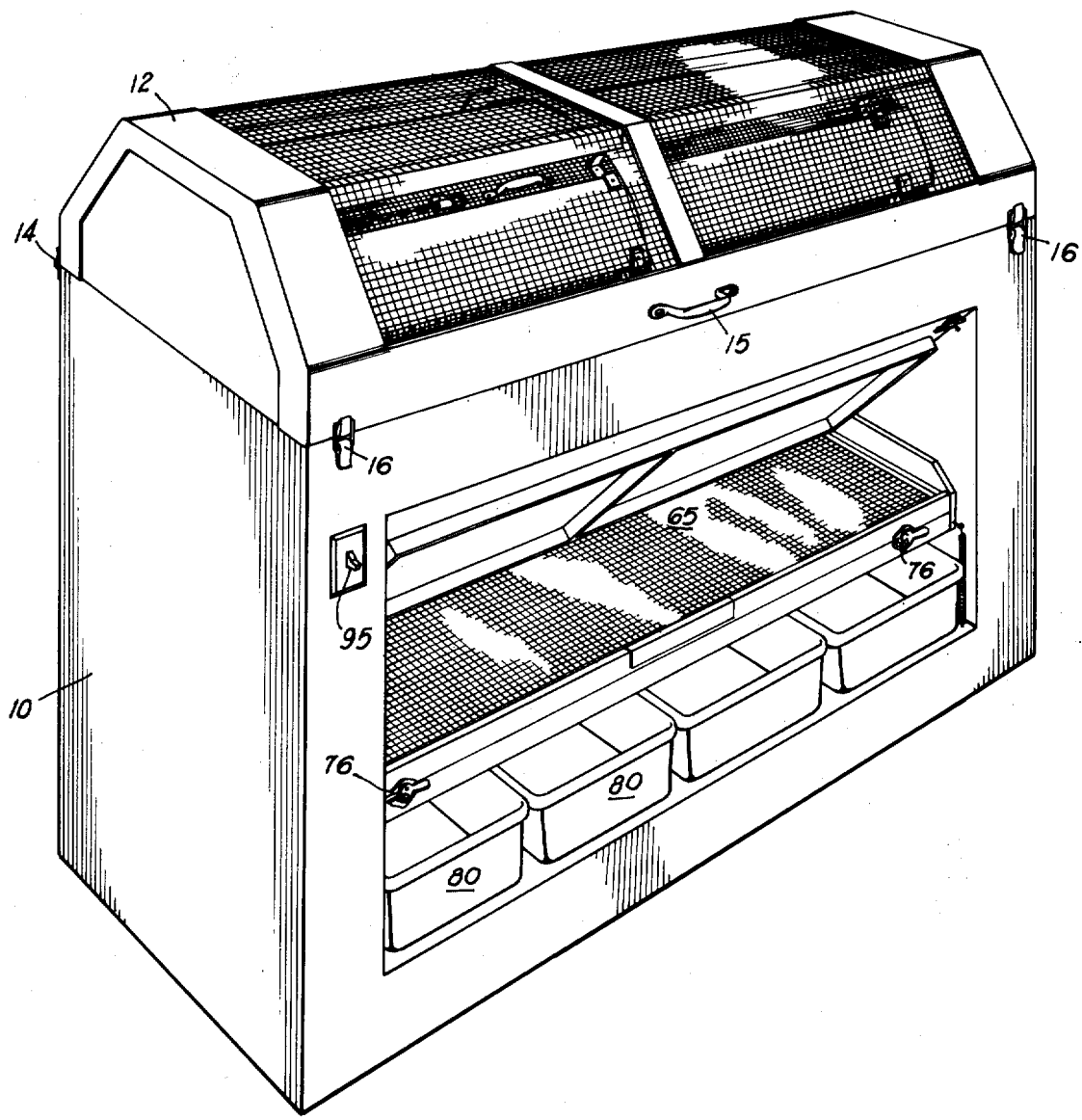
FIG. 1 is a perspective view of the exterior of a sheller embodying principles of the invention in a preferred form.
Figure 2:
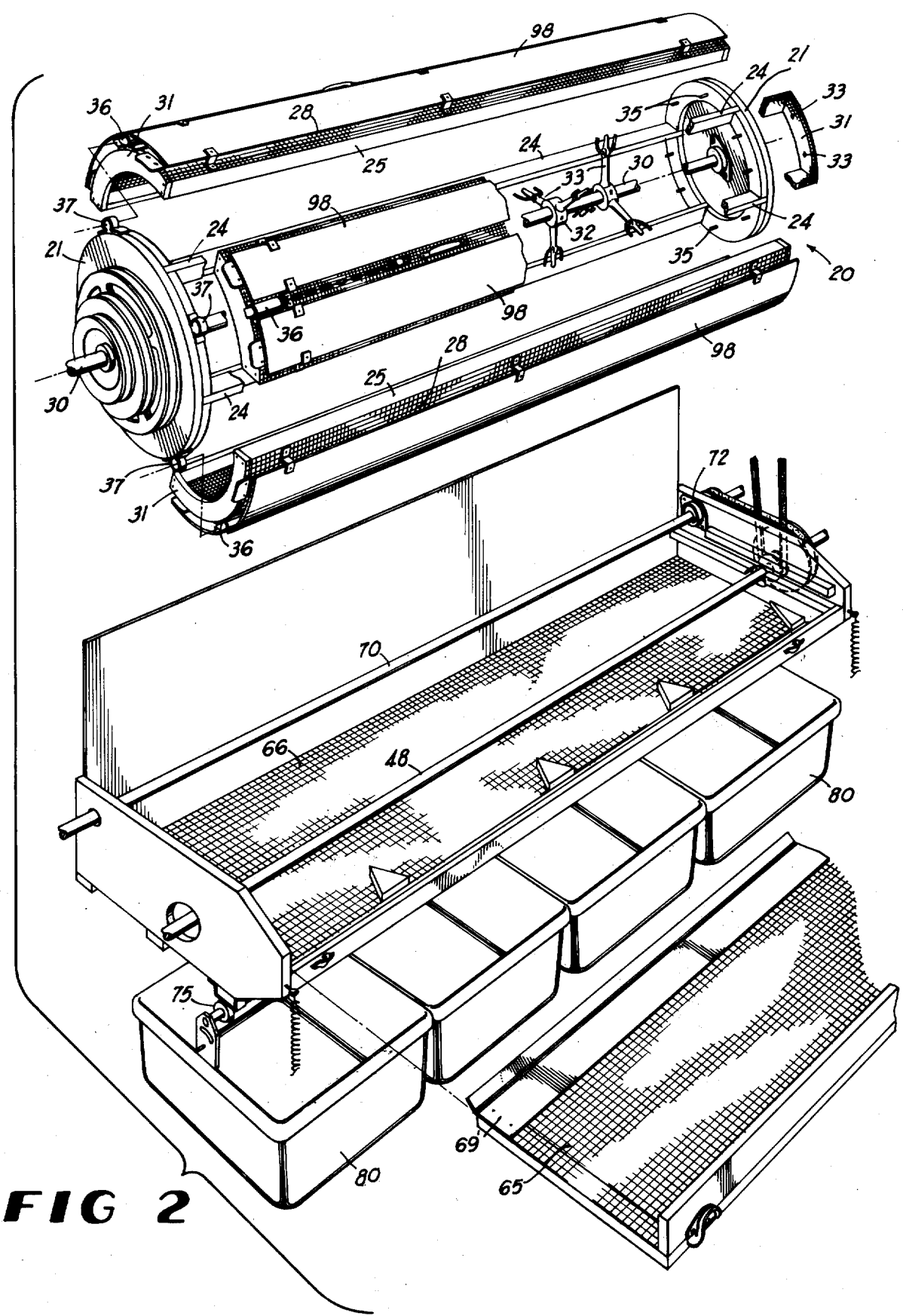
FIG. 2 is an exploded view of internal components of the sheller illustrated in FIG. 1.
Figure 3:
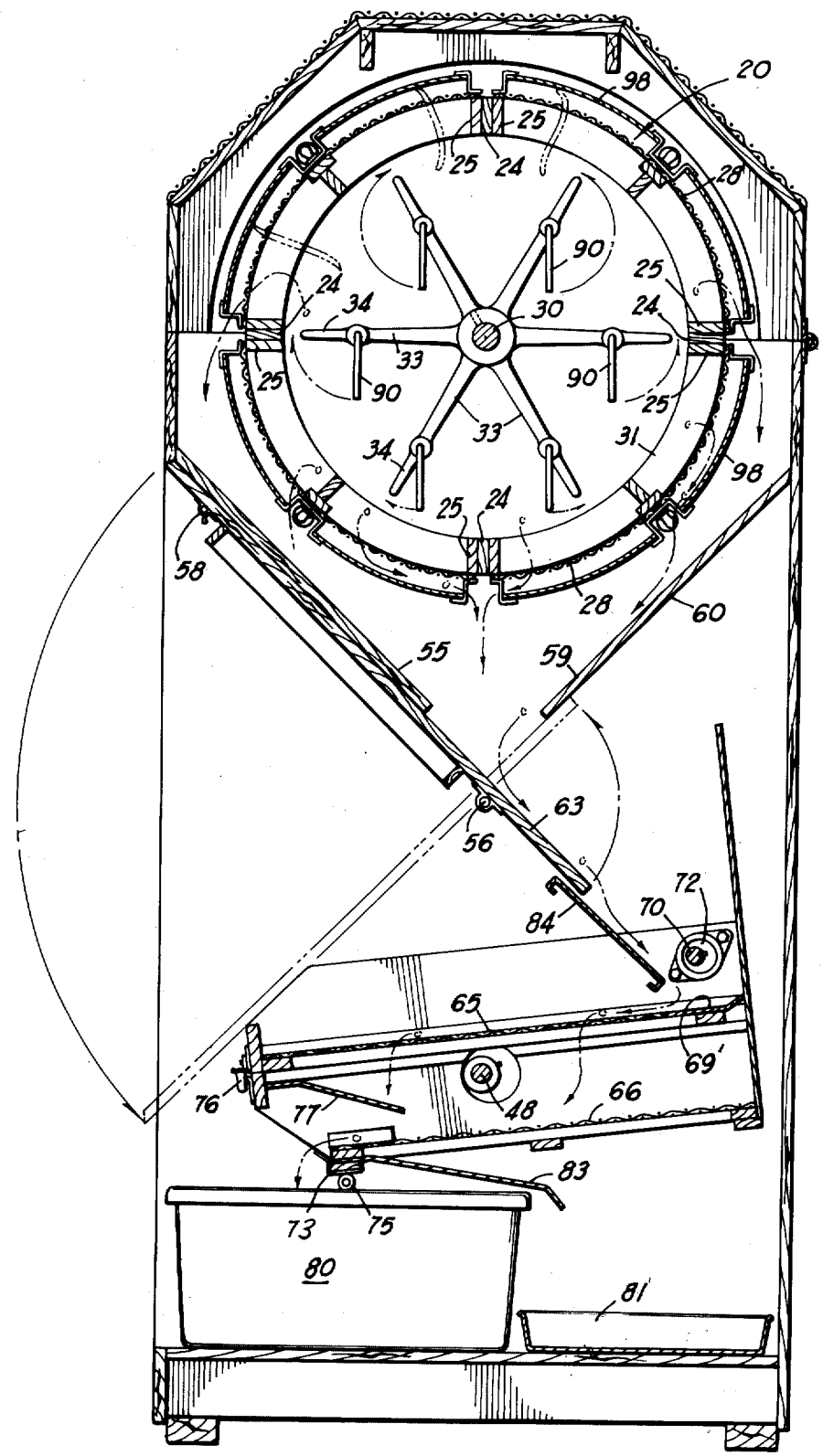
FIG. 3 is a cross sectional view of the shelling machine shown in FIGS. 1 and 2.

Referring now in more detail to the drawing, and in particular to FIGS. 1-3, there is shown a machine suitable for shelling beans, peas and other legumes. The machine is seen to include a housing or frame 10 having a lid or cover 12 pivotably mounted to the top of the frame by a pair of hinges 14. The lid is provided with a handle 15 and a pair of latches 16 for latching the lid in the lid closed position as shown in FIG. 1. A portion of the lid is seen to comprise metallic screening through which operation of the sheller may be viewed with the lid in the lid closed position.

With particular reference to FIGS. 2 and 3 the shelling machine is seen further to include a rotatable cylindrical drum 20 pervious to the passage of fruit of the legumes to be shelled. The drum includes a pair of end plates 21 linked by a set of four, angularly spaced beams 24 about which four cylindrically segmented screen doors 28 are secured. Each door has two beams 25 and two end ribs 31 positionable between the two end plates 21. Each of these doors is adapted to be readily removed from the sheller machine by means of holes 33 formed in ribs 31 in alignment with pegs 35 projecting inwardly from one end plate 21 and latching means mounted adjacent the other end of each door comprising a spring biased sliding bolt 36 and a bolt receptacle 37.

Figure 4:
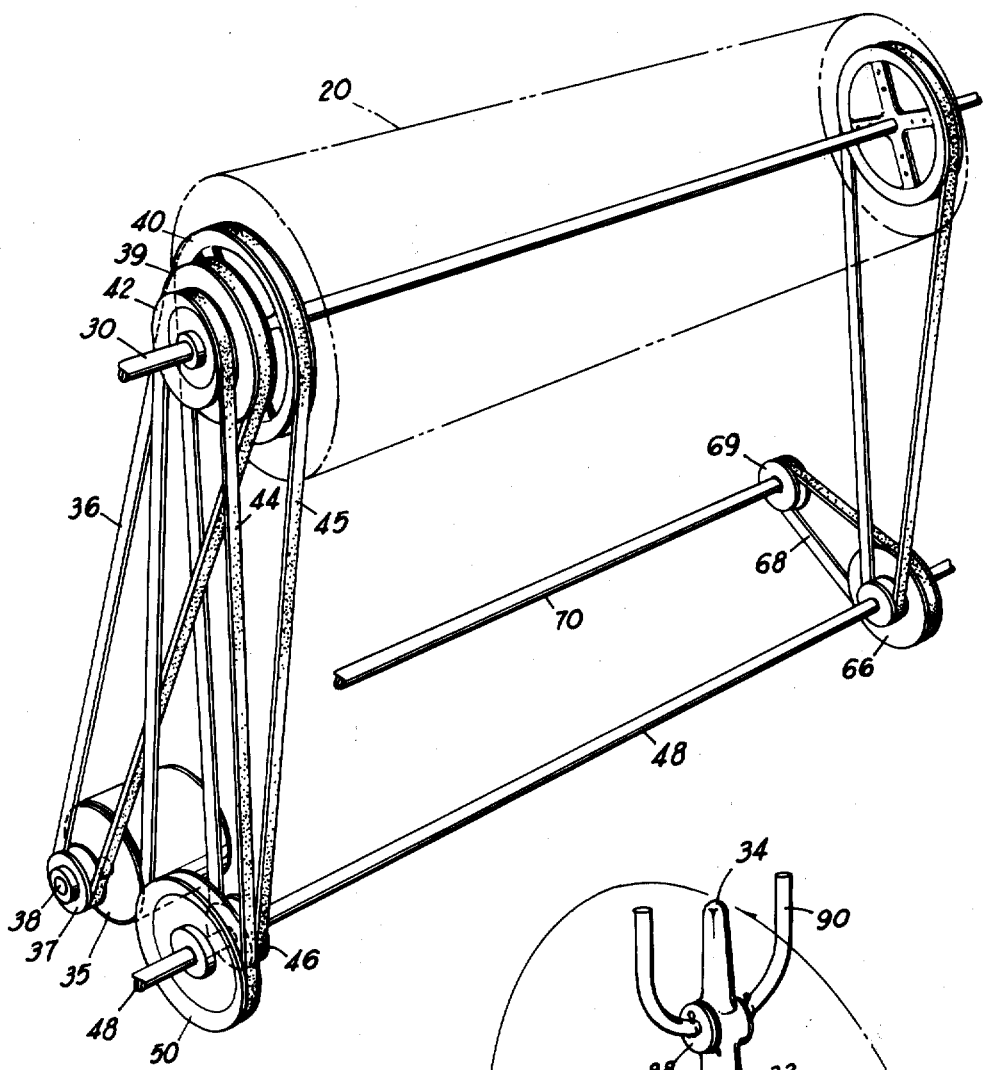
FIG. 4 is a perspective view of drive means employed in the shelling machine of FIGS. 1-3.
Figure 5:
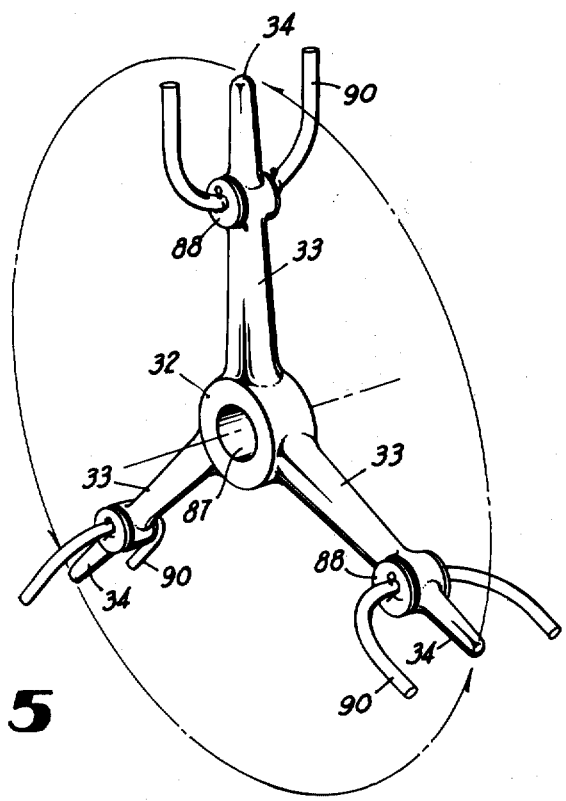
FIG. 5 is an enlarged, perspective view of a single beater of the sheller shown in FIGS. 1-3.

With continued reference to FIGS. 1-3, and also to FIGS. 4-6, the machine is further seen to include a shaft 30 rotatably mounted to frame 10 along the axis of drum 20. A plurality of axially spaced beaters are mounted to the shaft. Each beater is seen to include a hub 32 rigidly mounted about the shaft from which hub extends three radially spaced spokes 33 at the ends of which is unitarily formed tapered fingers 34. The taper on the fingers 34 tends to keep the pods in motion in the drum and prevents their entanglement or piling up or hanging on the rotary beaters. Both the drum itself and the beaters are driven by an electric motor 35 with power being transmitted from the motor to the drum by means of a belt 36 coupling a pulley 37 mounted to the motor output shaft 38 with a pulley 39 keyed to another pulley 40 secured to a drum end plate 21. Shaft 30, to which the beaters are mounted, is driven faster than the drum by means of a pulley 42 rigidly mounted to the shaft coupled with pulley 39 by a pair of belts 44 and 45. Belt 44 is looped over pulley 42 and a pulley 50 secured to a jack shaft 48 while belt 45 is looped over pulley 40 and pulley 46 secured also to the jack shaft. Preferably, the pulleys are sized and the motor speed set to drive the drum at a speed of approximately 50 RPM and the beaters at a speed of 280 RPM in the same rotary direction. This speed differential of some 5½ to 1 has been found to be quite effective for the shelling of butterbeans.

Beneath the rotary drum 20 is mounted a fixed inclined baffle 55 which converges downwardly with another fixed baffle 60 on the opposite side of the machine frame. A coacting pivoted baffle 63 mounted between its upper and lower end on a fixed pivot pin 56 is held normally inclined and in abutment with the lower side of fixed baffle 55 by a latch 58, as during the shelling operation. During removal of hulls from the drum, the latch 58 is released and the pivoted baffle 63 swings to the inclined position shown in broken lines in FIG. 3 where its lower end abuts the underside of fixed baffle 60, serving as a limit stop for the pivoted baffle. While in the full line position shown in FIG. 3, a stationary inclined baffle extension 84 cooperates with the baffle 63 in delivering the shelled legumes onto the underlying vibrating sieve structure.

Beneath the two baffles is adjustably mounted a pair of flat, vibrating sieves 65 and 66 rigidly secured together for eccentric movement when driven by motor 35. In so vibrating the sieves power is transmitted through jack shaft 48, a pulley 66 mounted thereto, and a belt 68 looped over pulley 66 and another pulley 69 secured to shaft 70 journalled in eccentric bearing 72. The lower end 73 of the lower sieve 66 rests atop a roller 75. The upper sieve 65 is sized for grading the fruit of shelled legumes so that excessively large fruit is collected from atop the lower end thereof. The lower sieve is sized to permit trash to pass therethrough while restricting the passage of the fruit. A pair of sash locks 76 releasably hold the upper sieve to its supporting frame 79. A set of collection bins 80 may be placed beneath the lower end of the sieve and unshown hull collection bin positioned in front of the machine to receive hulls from baffle 63. Trash bins 81 are positioned beneath the lower sieve behind collection bins 80. A baffle 77 is mounted beneath a lower end portion of sieve 65 while another baffle 83 is mounted beneath a lower end portion of sieve 66. An angular aluminum strip 69' is fastened atop sieve 65 along the rear edge thereof to orient the beans flat atop the sieve and prevent jamming.

With reference again to FIGS. 5 and 6 the beaters are seen to be formed with a cylindrical passageway 87 therethrough at the juncture of spokes 33 and fingers 34. A pair of cylindrical bearings 88 are seated in the ends of this passageway. A U-shaped swing arm 90 is journalled through the bearings and cotter pins 91 then passed through holes 92 in the swing arms just outside the faces of the bearings. In this embodiment, which is particularly well suited for shelling peas, the swing arm itself is composed solely of a solid, metallic rod formed into the shape of a U.

In operation, unshelled legumes may be placed within the drum by temporarily lifting lid 12 and removing a screen door. Once loaded, the door replaced and the lid closed the motor may be energized by operation of switch 95 thereby causing the drum to commence to rotate at a low speed relative to that of the beaters. Initial movement of the beaters against the hulls is facilitated, and overload conditions thereby avoided, by virtue of the fact that the swing arms give way through rotary movement under the resistive force of the hulls packed thereabout. As speed is obtained the swing arms remain free to rotate as they strike the hulls although at most times they remain oriented generally as shown in FIG. 5 under the influence of centrifugal forces. This action strips the peas from their pods and and allows them to pass through the drum as indicated by the arrows in FIG. 3 and gravitate, down over baffle 55 and 63 and baffle extension 84 and onto sieve 65 while the bean hulls are trapped within the drum. Jamming of the hulls within the screen doors is inhibited by the presence of a set of shrouds 98 mounted in spaced relation about screen doors 28. As sieve 65 vibrates oversized peas flow down its inclined plane to one end thereof while the others pass therethrough downwardly onto the lower sieve 66. From here the peas flow over the sieve off the end thereof into the collection bins 80 as indicated by the arrows. Simultaneously with this movement small bits of trash fall through both the sieves and into the trash collection bin 81. The presence of baffles 77 and 83 here serve to prevent trash from descending into the bins. 80. Once shelling is completed the motor is deenergized and the peas and trash removed. The hulls may then be removed by pivoting the pivotal baffle, removing a screen door, and inverting the drum.

Referring next to FIG. 7 a modification to the beater of FIG. 6 is shown wherein the beater spoke 101 is rectangular rather than rounded, and wherein a paddle 102, formed unitarily with the shank, replaces the rounded finger. The paddle has two opposing faces each of which is seen to comprise two planar surfaces 104 joined together along the spoke axis at an obtuse angle. Each surface is preferably inclined at an angle with a plane normal to the plane of rotation of between 7½° and 10° to deflect legumes to each side of the paddle. This shape is particularly well suited for the shelling of butterbeans.

Figure 11:
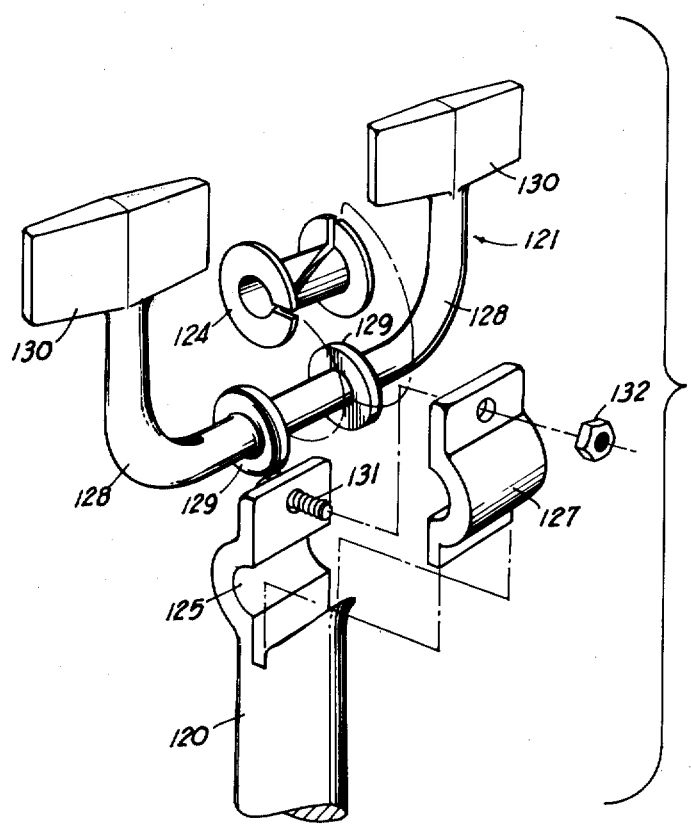
FIG. 11 is an exploded view, in perspective, of a portion of a beater in another, alternative form for use in a sheller of the type shown in FIGS. 1-3.
Figure 12:
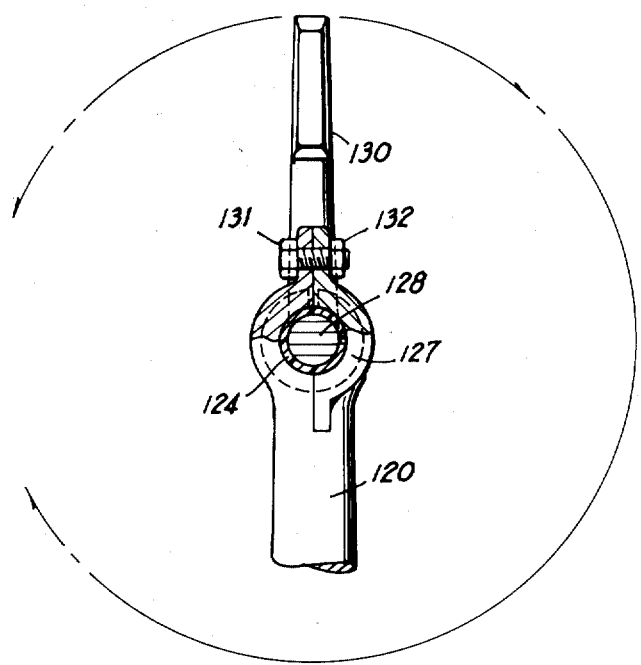
FIG. 12 is a side elevational view, partly in cross section, of the beater shown in FIG. 11.
Figure 13:
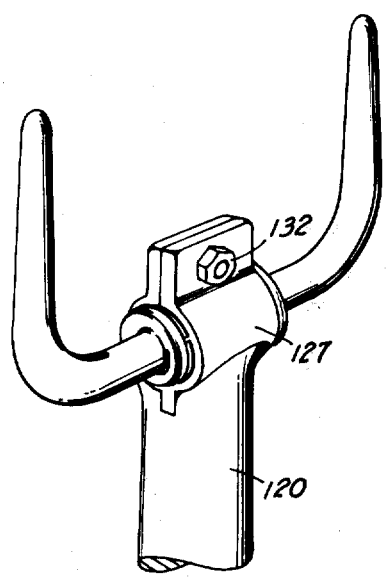
FIG. 13 is an assembled, perspective view of the beater shown in FIG. 11.
Figure 14:
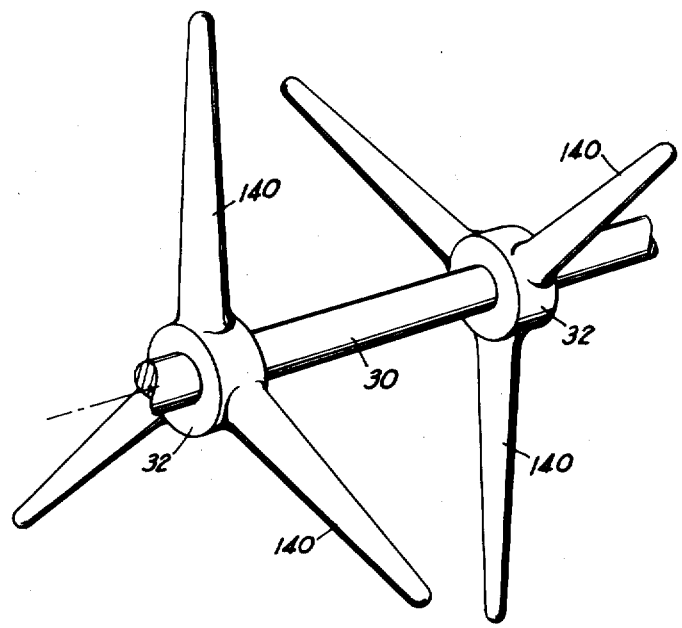
FIG. 14 is a perspective of beaters in yet another, alternative form for use in a sheller of the type shown in FIGS. 1-3.
Figure 15:
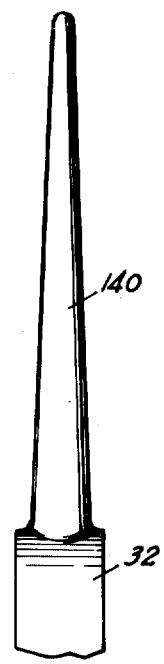
FIG. 15 is a side elevational view of a portion of one of the beaters illustrated in FIG. 14.
Figure 16:
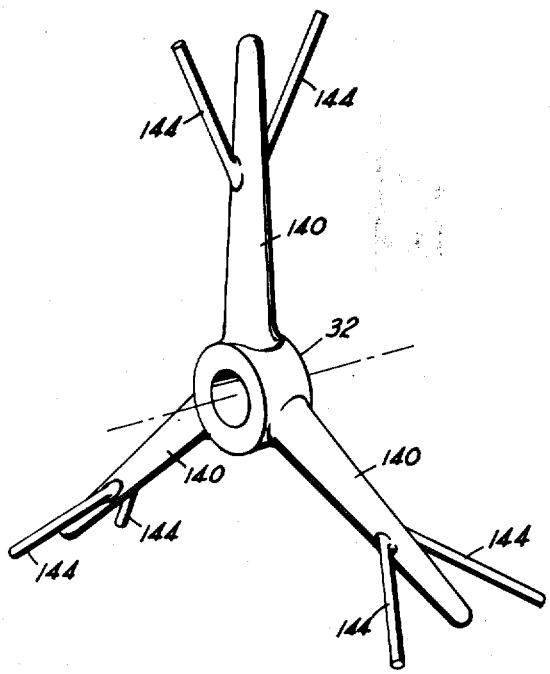
FIG. 16 is a perspective view of still another beater for use in a sheller of the type shown in FIGS. 1-3.
Figure 17:
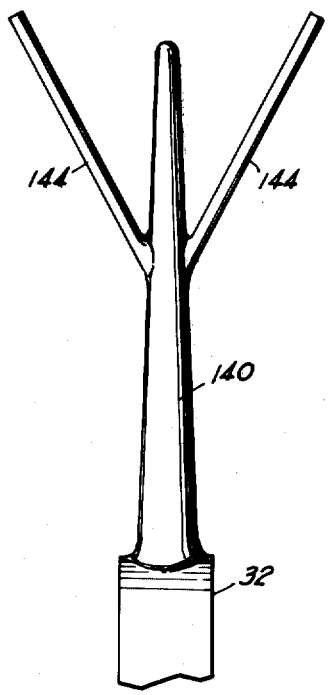
FIG. 17 is a side elevational view of a portion of the beater shown in FIG. 16.

With reference next to FIGS. 8 – 10 another beater is shown having three spokes 110 extending radially from one unshown hub and with a swing arm 111 in the shape of the paddle 102 of FIG. 7 hinged to the end of the spoke about a pivot pin or bolt 113. A rubber stop 112 is mounted in a hole formed in the spoke adjacent the hinge. In FIGS. 11 and 12 yet another beater configuration is shown where again three spokes 120 radiate from an unshown hub. A U-shaped swing arm 121 is rotatably mounted to the end of each spoke by being journalled through a split nylon bearing 124 seated in a concave recess 125 in the spoke with a U-shaped clamp 127 secured thereabout by screw 131 and nut 132. The swing arm comprises a U-shaped solid, cylindrical rod 128 having two paddles 130 formed on each end thereof side by side. A central portion of the rod is provided with two flanges 129 to inhibit axial displacement within the bearing. In FIG. 13 the just described beater is shown without the paddles 130 thereby rendering it more suited for the shelling of peas. In FIGS. 14 and 15 beaters of simple construction are shown having hubs 32 from which three tapered, cylindrical fingers 140 radiate with adjacent beaters being radially offset whereby hulls are deflected from one beater into the path of the next. Finally, in FIGS. 16 and 17 the just described, relative simple beaters are shown with spoke ends forked with the provision of a pair of extension arms 144.

It should be understood that the just described embodiments merely illustrate principles of the invention in preferred forms. Many modifications, additions and deletions may, of course, be made thereto without departure from the spirit and scope of the invention as set forth in the following claims.

What is claimed is:

1. A machine for shelling beans, peas and other legumes comprising a generally cylindrical, rotatable screen drum; shroud means mounted about said cylindrical screen in spaced relation therewith for restricting the passage of legumes therethrough; a plurality of axially spaced sets of paddles mounted for rotation within said cylindrical screen; and drive means for rotating said drum and said sets of paddles.

2. A machine in accordance with claim 1 wherein said shroud means comprises a plurality of arcuate plates overlaying a plurality of radial segments of said cylindrical screen drum.

3. A machine for shelling legumes as defined in claim 1, wherein said rotatable screen drum is formed in plural circumferential sections, and means for releasably securing said sections in assembled relationship on the drum.

4. A machine for shelling legumes as defined in claim 1, and a pair of inclined downwardly converging spaced baffles fixedly mounted beneath said rotatable screen drum, a swingable baffle mounted on a fixed pivot element below said fixedly baffles and being swingable to a pair of alternate use positions in abutment with the bottom faces of the fixedly mounted baffles, and a vibratory sieve means arranged beneath said fixedly mounted and said swingable baffles.

5. In a machine for shelling legumes as defined in claim 1, and said drive means including means for rotating said drum in one direction at a first speed of rotation and for rotating said paddles in the same direction at a second speed of rotation greater than said first speed.

6. In a shelling machine, a rotatable screen drum, a plurality of beaters mounted for rotation within said drum, power drive means coupled with said drum and beaters to drive them in unison, the beaters having radially extending arms in the drum, bearing elements on said radially extending arms, and generally U-shaped free-swinging elements journaled in said bearing elements of the arms, the free-swinging elements turning with the arms in said drum and swinging independently relative to the arms.

7. In a shelling machine as defined in claim 6, and said power drive means including means to drive said drum and said beaters in the same direction of rotation at different speeds of rotation and with the beaters rotating at a greater speed than said drum.

8. In a shelling machine as defined in claim 6, and wherein each U-shaped free-swinging element has a pair of paddles on its end terminals in side-by-side relation and joined by the body of the U-shaped free-swinging element.

9. In a shelling machine as defined in claim 8, and said paddles each having opposite side planar faces which meet at obtuse angles for deflecting shelled legumes from the paddles and U-shaped free-swinging elements.

10. A machine for shelling legumes comprising a frame, a pervious drum rotatably mounted on said frame, a shaft rotatably mounted on said frame and extending axially through said pervious drum, a plurality of axially spaced beaters rigid with said shaft within said drum and having shanks extending radially from the shaft, rotatable swing elements on the shanks near the outer ends of the shanks, the swing elements being substantially U-shaped and each swing element having a pair of paddles on opposite sides of the shank joined as a unit with the body of the U-shaped swing element.

11. A machine for shelling legumes as defined in claim 10, wherein each shank carries a bearing through which said substantially U-shaped swing element is journaled.

* * * * *